W. K. RICHARDSON.
PROCESS OR METHOD OF PURIFYING OR CLARIFYING WATER
APPLICATION FILED OCT. 1, 1908.

958,769.

Patented May 24, 1910.

WITNESSES:
E. A. Cahill
M. L. Richardson

INVENTOR.
Wm. K. Richardson

UNITED STATES PATENT OFFICE.

WILLIAM KING RICHARDSON, OF LEAVENWORTH, KANSAS.

PROCESS OR METHOD OF PURIFYING OR CLARIFYING WATER.

958,769.  Specification of Letters Patent.  Patented May 24, 1910.

Application filed October 1, 1908. Serial No. 455,590.

*To all whom it may concern:*

Be it known that I, WILLIAM KING RICHARDSON, a citizen of the United States, residing at Leavenworth, in the county of Leavenworth and State of Kansas, have invented a new and useful Improvement in Processes or Methods of Purifying and Clarifying Water, of which the following is a specification.

This invention relates to a process or method of purifying and clarifying water, in a revolving receptacle by centrifugal force, and has for its object, to evolve a process or method whereby the precipitation and separation of all the solid and impure matter contained in the water of a greater specific gravity than water, is effected instantly thoroughly and inexpensively. That this may be understood reference is to be had to the accompanying drawings, in connection with the process herein described.

Figure 1:
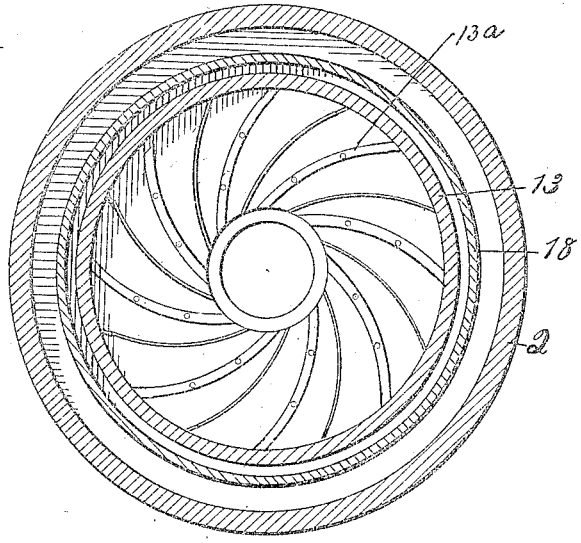
Figure 2:
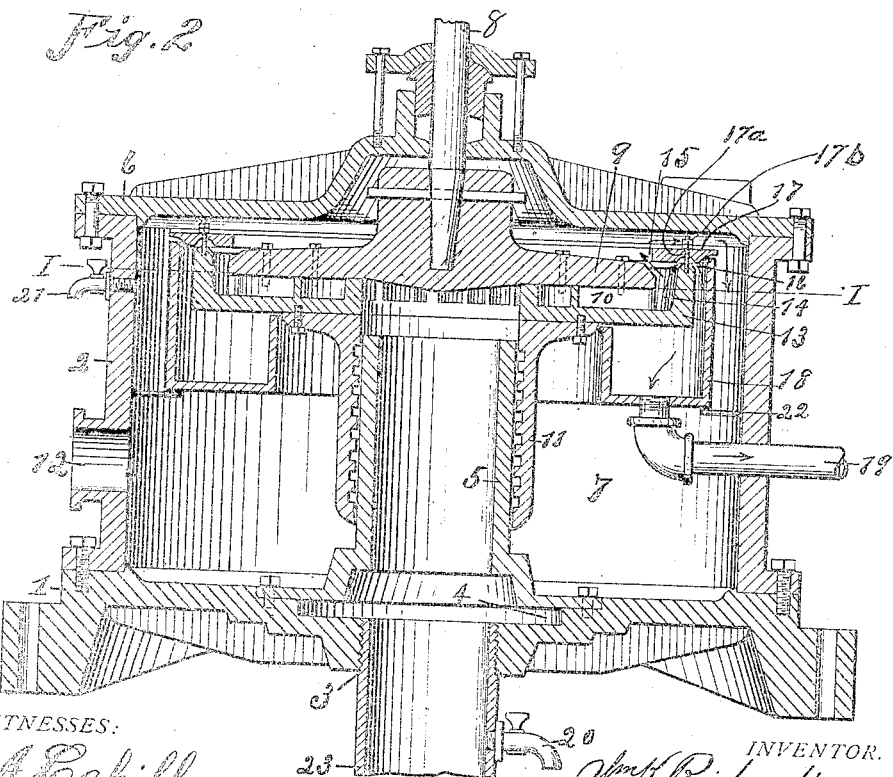

Figure 1, is a section on line 1—1 of Fig. 2. Fig. 2, is a vertical section.

In said drawing 1, designates the base plate of this apparatus, which is bolted or otherwise secured to annular casing 2; the base plate having a central threaded opening 3, and an internal central opening 4, of greater diameter than 3, formed by an offset or step as shown. Secured to step of opening 4, is a semi-steel or strong cast iron water-column 5, the flange of which is faced and turned, the outside perpendicular wall of water-column being turned and polished.

6, indicates the top plate, bolted or otherwise secured to casing 2, and with base plate 1, forms the air and water chamber of the pump 7.

8, indicates the shaft which is keyed to driver 9.

10, is the chamber of the impeller which is formed by bolting driver 9, to casting 13.

11, indicates a cast steel water-seal sleeve, which should be turned all over, with water-seal grooves cut as shown in Fig. 1; this water-seal sleeve is bolted to member 13, and is to prevent water from entering the impeller from the air and water chamber 7, its lower end always being immersed below the surface of the water.

12, indicates outlet or discharge for pure water.

13, indicates a disk of greater diameter than member 9 with outer portion turned up as shown in drawings, and when bolted to driver 9 the annular water chamber 14 is formed between the upward and outward deflected inner wall of member 13 and periphery of member 9; the center of said disk having a suitable opening which forms the intake to chamber 10.

13ª, indicates the impeller blades which are cast integral with member 13 and are of usual type.

14, is an annular water chamber.

15, indicates discharge port for pure water from chamber 14 into chamber 7; 16, discharge port for solid matter and impure water from chamber 14 into reservoir 18. 17, an annular check valve which partly covers the annular water chamber 14, extending over the driver 9 sufficiently far that the port 15, will form a liquid seal to the chamber 10, and supported upon the outer rim of casting 13, and held in place by studs 17ª inserted into casting 13; on the end of these studs are lock nuts 17ᵇ for regulating the throw of the valve; the valve seat being formed as shown and for the purpose of opening and closing the restricted passage 16, as hereinafter described.

18, indicates a secondary reservoir for the purpose of receiving the water and impurities discharged through port 16, having outlet through pipe 19.

20, indicates an air valve in the suction 23, said suction being provided with a check or foot valve of usual type, not shown. 21, an air valve which communicates with the air and water chamber 7, through casing 2.

22, is a ledge or bracket on which is supported the reservoir 18.

Having thus described the several parts of this machine, I will describe its operation, and results obtained therefrom.

This pump is primed in the usual way: the suction pipe is filled with the fluid to be pumped to a level of the impeller: power is applied to the impeller through the shaft 8: the revolving impeller forces the fluid to the periphery and fills the annular water chamber 14 the same being so constructed that no fluid is discharged from the port 15 until the fluid has flooded the periphery of the impeller, rendering the chamber of the impeller air tight in relation of backward flow of the air in air and water chamber 7. As the fluid is forced into the chamber 7 the air which is confined becomes compressed in ratio to the resistance of head or pressure pumped. Should the head be such as to compress the air to such a density that the water rises to the level of the impeller, by opening the air valve 20 in the suction, air is introduced into the chamber, and the water is forced to a lower level. Should the air valve 20, remain open the confined air would force the water level to remain just below the top part of water discharge pipe 12, at which point the air would then escape with the water as it was being forced out of the pump. The pressure of the water upon the under side of the valve 17, causes it to rise against the lock nuts which are set at any desired height to regulate the cross section of discharge opening 16. The centrifugal force throws the matter contained in the water of a greater specific gravity than water, against the outer wall of chamber 14, where, by the erosive action of the water and centrifugal force, it is deflected along the outer wall of chamber 14 and through discharge opening 16 into the reservoir 18, the larger portion of the water flowing into chamber 14, being discharged through port or opening 15.

It should be stated it requires great centrifugal force to effect efficient separation of the impurities from the water, and that high velocities of flow, racing of the fluid, eddy currents, and shock, must be avoided, and air is the agent used in connection with the herein described form of instrumentality used in carrying out this process, by retaining the chamber of the impeller filled with water, by resisting the delivery of water therefrom. Not employing this air cushion against which the water is delivered and held in check, the water would issue from the center of the impeller, with a velocity increasing toward the periphery directly as the rotary velocity of the impeller at that point, and at the periphery of the impeller where the water is discharged into the annular water chamber which surrounds it, its velocity of flow would be great, and the impact therefrom would cause violent agitation of the water in this chamber, and the velocity of flow would entrain and carry with it the matter desired to be separated. In employing this air pressure this condition does not exist, for if the air pressure within the casing is, say, 90 lbs. gage pressure, the machine must rotate at a speed sufficient to generate a centrifugal force slightly exceeding 90 lbs. before any water will be delivered from the annular discharge chamber, and its velocity of flow from the intake or center toward the periphery diminishes, for the area of cross section of the chamber of the impeller increases toward the periphery, and the velocity of flow of the water at the periphery is directly as the volume of water pumped. Therefore, it is plain to be seen with this air cushion the impeller is held full of water, and its velocity of flow moderate even when the machine is delivering its maximum volume. The aeration of water is an additional function the air performs in the purification of the water in this process, and it is only necessary to call attention to this fact, that the condition exists; for the water is thrown off with the peripheral speed of the impeller and impinges on the side of the casing, becomes atomized and saturated with air; it then falls by gravity to the bottom of the casing, there to be discharged by the repulsive action of the air under pressure, separate from its impurities a finished product under hydraulic head, sufficient for its distribution and use.

The ends of the impeller blades extend across chamber 14 so that the issuing water from chamber 10 of the impeller will have a velocity imparted to it equal to the velocity of the rotating impeller at that point for the purpose of preventing the racing of the fluid in the annular water chamber 14.

The water discharged by centrifugal force through ports 15 and 16 into chamber 7 containing air which is confined, becomes compressed in ratio to the resistance of head or pressure pumped. This air cushion is the potential power which expels the fluid from chamber 7 through discharge 12 and the impure water in reservoir 18 through discharge 19.

The structure is not herein specifically claimed, the same being shown and specifically claimed in my co-pending application, Serial No. 455,555.

Having thus described the invention what I claim as new and desire to secure by Letters Patent, is:—

1. The process or method of purifying or clarifying water, which consists in subjecting water in the presence of air under pressure, to rotary velocity sufficient to separate the solid matter contained in, and held in suspension in the water, and discharging by pneumatic pressure the solid matter with a portion of the water, and discharging the pure water separately, both being delivered from said apparatus substantially as described.

2. The process or method of purifying and clarifying water, which consists in subjecting water to the action of centrifugal force in the presence of air under pressure, aerating and discharging the pure water by pneumatic pressure, and separately discharging the precipitate by pneumatic pressure, substantially as described.

WILLIAM KING RICHARDSON.

Witnesses:
M. K. RICHARDSON,
M. L. RICHARDSON.